US012518695B2

(12) United States Patent
Kim et al.

(10) Patent No.: US 12,518,695 B2

(45) Date of Patent: Jan. 6, 2026

(54) EMISSION DRIVER AND DISPLAY DEVICE INCLUDING SAME

(71) Applicant: Samsung Display Co., Ltd., Yongin-Si (KR)

(72) Inventors: Jong Hee Kim, Yongin-si (KR); Bo Yong Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/732,099

(22) Filed: Jun. 3, 2024

(65) Prior Publication Data

US 2025/0078753 A1 Mar. 6, 2025

(30) Foreign Application Priority Data

Sep. 4, 2023 (KR) ........................ 10-2023-0117136

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2310/0286* (2013.01); *G09G 2310/08* (2013.01)

(58) Field of Classification Search
CPC ......... G09G 3/3266; G09G 2300/0861; G09G 2310/0262; G09G 2310/0283; G09G 2310/0286; G09G 2330/025; G09G 2330/027; G09G 3/3233; G11C 19/184; G11C 19/28
See application file for complete search history.

(56) References Cited

U.S. PATENT DOCUMENTS

| | | | | |
|---|---|---|---|---|
| 11,727,885 B2 | 8/2023 | Kim et al. | | |
| 2012/0176417 A1* | 7/2012 | Jang | ..................... | G11C 19/184 345/77 |
| 2022/0262318 A1* | 8/2022 | Park | ..................... | G09G 3/3225 |

FOREIGN PATENT DOCUMENTS

KR 10-20230087700 A 6/2023

* cited by examiner

*Primary Examiner* — Stacy Khoo
(74) *Attorney, Agent, or Firm* — Innovation Counsel LLP

(57) ABSTRACT

An emission driver is disclosed that includes stages. Each of the stages includes a first circuit part configured to apply a first node voltage to a first node, a second circuit part configured to apply a second node voltage to a second node and connected to the first circuit part through a third node, a third circuit part configured to apply a third node voltage of the third node or a voltage higher than the third node voltage to a fourth node based on the first node voltage and the second node voltage, and a fourth circuit part configured to generate an emission signal based on the first node voltage and a fourth node voltage of the fourth node.

18 Claims, 9 Drawing Sheets

EMISSION DRIVER AND DISPLAY DEVICE INCLUDING SAME

CROSS REFERENCE TO RELATED APPLICATION

This application claims priority to and the benefit of Korean Patent Application No. 10-2023-0117136 filed in the Korean Intellectual Property Office on Sep. 4, 2023, the entire contents of which are incorporated herein by reference.

BACKGROUND

1. Field

The present disclosure relates to an emission driver and a display device.

2. Description of the Related Art

Along with the development of information technology, the importance of display devices providing information to users and has increased. Applications of display devices such liquid crystal display (LCD) devices and organic light-emitting display (OLED) devices has also increased.

Display devices display an image through a plurality of pixels. The display device may include an emission driver configured to supply emission signals to determine emission timings of the plurality of pixels.

SUMMARY

The present disclosure may provide an emission driver and a display device including the same, the driver and device being able to supply emission signals having uniform duty ratios.

An emission driver according to an embodiment includes stages. Each of the stages includes: a first circuit part configured to apply a first node voltage to a first node; a second circuit part configured to apply a second node voltage to a second node and connected to the first circuit part through a third node; a third circuit part configured to apply a third node voltage of the third node or a voltage higher than the third node voltage to a fourth node based on the first node voltage and the second node voltage; and a fourth circuit part configured to generate an emission signal based on the first node voltage and a fourth node voltage of the fourth node.

The first circuit part and the second circuit part may have circuit structures symmetrical about the third node.

The first circuit part and the second circuit part may receive the same input signals.

The third circuit part may include: a first transistor including a gate electrode connected to the first node, a first electrode connected to the third node, and a second electrode connected to the fourth node; and a second transistor including a gate electrode connected to the second node, a first electrode connected to the fourth node, and a second electrode configured to receive a first high voltage.

The third node voltage may be a first low voltage.

The fourth circuit part may include: a third transistor including a gate electrode connected to the first node, a first electrode configured to receive a second high voltage, and a second electrode connected to a first output terminal configured to output the emission signal; and a fourth transistor including a gate electrode connected to the fourth node, a first electrode connected to the first output terminal, and a second electrode configured to receive a second low voltage.

The first circuit part may include: a fifth transistor including a gate electrode connected to the first node, a first electrode configured to receive a clock signal, and a second electrode connected to a second output terminal; a first capacitor including a first electrode connected to the first node and a second electrode connected to the second output terminal; a sixth transistor including a gate electrode connected to a fifth node, a first electrode connected to the second output terminal, and a second electrode connected to the third node; a second capacitor including a first electrode connected to the fifth node and a second electrode connected to the third node; a seventh transistor including a gate electrode connected to a first input terminal, a first electrode configured to receive the first high voltage, and a second electrode connected to the first node; an eighth transistor including a gate electrode connected to a second input terminal, a first electrode configured to receive the first high voltage, and a second electrode connected to the fifth node; a ninth transistor including a gate electrode connected to the first node, a first electrode connected to the fifth node, and a second electrode connected to the third node; a (10-1)th transistor including a gate electrode connected to the fifth node, a first electrode connected to the first node, and a second electrode; a (10-2)th transistor including a gate electrode connected to the fifth node, a first electrode connected to a second electrode of the (10-1)th transistor, and a second electrode connected to the third node; an (11-1)th transistor including a gate electrode connected to the second input terminal, a first electrode connected to the first node, and a second electrode; an (11-2)th transistor including a gate electrode connected to the second input terminal, a first electrode connected to a second electrode of the (11-1)th transistor, and a second electrode connected to the third node; an (12-1)th transistor including a gate electrode connected to the first node, a first electrode configured to receive the first high voltage, and a second electrode; and a (12-2)th transistor including a gate electrode connected to the first node, a first electrode connected to a second electrode of the (12-1)th transistor, and a second electrode connected to a second electrode of the (10-1)th transistor and a second electrode of the (11-1)th transistor.

The second circuit part may include: a thirteenth transistor including a gate electrode connected to the second node, a first electrode configured to receive the clock signal, and a second electrode connected to a third output terminal; a third capacitor including a first electrode connected to the second node and a second electrode connected to the third output terminal; a fourteenth transistor including a gate electrode connected to a sixth node, a first electrode connected to the third output terminal, and a second electrode connected to the third node; a fourth capacitor including a first electrode connected to the sixth node and a second electrode connected to the third node; a fifteenth transistor including a gate electrode connected to the second input terminal, a first electrode configured to receive the first high voltage, and a second electrode connected to the second node; a sixteenth transistor including a gate electrode connected to the first input terminal, a first electrode configured to receive the first high voltage, and a second electrode connected to the sixth node; a seventeenth transistor including a gate electrode connected to the second node, a first electrode connected to the sixth node, and a second electrode connected to the third node; an (18-1)th transistor including a gate electrode connected to the sixth node, a first electrode connected to the second node, and a second electrode; an (18-2)th transistor including a gate electrode connected to the sixth node, a first electrode connected to a second electrode of the (18-1)th transistor, and a second electrode connected to the third node; a (19-1)th transistor including a gate electrode connected to the first input terminal, a first electrode connected to the second node, and a second electrode; a (19-2)th transistor including a gate electrode connected to the first input terminal, a first electrode connected to a second electrode of the (19-1)th transistor, and a second electrode connected to the third node; a (20-1)th transistor including a gate electrode connected to the second node, a first electrode configured to receive the first high voltage, and a second electrode; and a (20-2)th transistor including a gate electrode connected to the second node, a first electrode connected to a second electrode of the (20-1)th transistor, and a second electrode connected to a second electrode of the (18-1)th transistor and a second electrode of the (19-1)th transistor.

The second output terminal may output the first low voltage or the clock signal.

The third output terminal may output the first low voltage or the clock signal, and the clock signal output by the second output terminal and the clock signal output by the third output terminal may not overlap each other.

A display device according to an embodiment of the present disclosure includes: pixels; and stages configured to supply emission signals by which emission timings of the pixels are determined. Each of the stages includes: a first circuit part configured to apply a first node voltage to a first node; a second circuit part configured to apply a second node voltage to a second node and connected to the first circuit part through a third node; a third circuit part configured to apply a third node voltage of the third node or a voltage higher than the third node voltage to a fourth node based on the first node voltage and the second node voltage; and a fourth circuit part configured to generate the emission signals based on the first node voltage and a fourth node voltage of the fourth node.

The first circuit part and the second circuit part may have circuit structures symmetrical about the third node.

The first circuit part and the second circuit part may receive the same input signals.

The third circuit part may include: a first transistor including a gate electrode connected to the first node, a first electrode connected to the third node, and a second electrode connected to the fourth node; and a second transistor including a gate electrode connected to the second node, a first electrode connected to the fourth node, and a second electrode configured to receive a first high voltage.

The third node voltage may be a first low voltage.

The fourth circuit part may include: a third transistor including a gate electrode connected to the first node, a first electrode configured to receive a second high voltage, and a second electrode connected to a first output terminal configured to output the emission signal; and a fourth transistor including a gate electrode connected to the fourth node, a first electrode connected to the first output terminal, and a second electrode configured to receive a second low voltage.

The first circuit part may include: a fifth transistor including a gate electrode connected to the first node, a first electrode configured to receive a clock signal, and a second electrode connected to a second output terminal; a first capacitor including a first electrode connected to the first node and a second electrode connected to the second output terminal; a sixth transistor including a gate electrode connected to a fifth node, a first electrode connected to the second output terminal, and a second electrode connected to the third node; a second capacitor including a first electrode connected to the fifth node and a second electrode connected to the third node; a seventh transistor including a gate electrode connected to a first input terminal, a first electrode configured to receive the first high voltage, and a second electrode connected to the first node; an eighth transistor including a gate electrode connected to a second input terminal, a first electrode configured to receive the first high voltage, and a second electrode connected to the fifth node; a ninth transistor including a gate electrode connected to the first node, a first electrode connected to the fifth node, and a second electrode connected to the third node; a (10-1)th transistor including a gate electrode connected to the fifth node, a first electrode connected to the first node, and a second electrode; a (10-2)th transistor including a gate electrode connected to the fifth node, a first electrode connected to a second electrode of the (10-1)th transistor, and a second electrode connected to the third node; an (11-1)th transistor including a gate electrode connected to the second input terminal, a first electrode connected to the first node, and a second electrode; an (11-2)th transistor including a gate electrode connected to the second input terminal, a first electrode connected to a second electrode of the (11-1)th transistor, and a second electrode connected to the third node; an (12-1)th transistor including a gate electrode connected to the first node, a first electrode configured to receive the first high voltage, and a second electrode; and a (12-2)th transistor including a gate electrode connected to the first node, a first electrode connected to a second electrode of the (12-1)th transistor, and a second electrode connected to a second electrode of the (10-1)th transistor and a second electrode of the (11-1)th transistor.

The second circuit part may include: a thirteenth transistor including a gate electrode connected to the second node, a first electrode configured to receive the clock signal, and a second electrode connected to a third output terminal; a third capacitor including a first electrode connected to the second node and a second electrode connected to the third output terminal; a fourteenth transistor including a gate electrode connected to a sixth node, a first electrode connected to the third output terminal, and a second electrode connected to the third node; a fourth capacitor including a first electrode connected to the sixth node and a second electrode connected to the third node; a fifteenth transistor including a gate electrode connected to the second input terminal, a first electrode configured to receive the first high voltage, and a second electrode connected to the second node; a sixteenth transistor including a gate electrode connected to the first input terminal, a first electrode configured to receive the first high voltage, and a second electrode connected to the sixth node; a seventeenth transistor including a gate electrode connected to the second node, a first electrode connected to the sixth node, and a second electrode connected to the third node; an (18-1)th transistor including a gate electrode connected to the sixth node, a first electrode connected to the second node, and a second electrode; an (18-2)th transistor including a gate electrode connected to the sixth node, a first electrode connected to a second electrode of the (18-1)th transistor, and a second electrode connected to the third node; a (19-1)th transistor including a gate electrode connected to the first input terminal, a first electrode connected to the second node, and a second electrode; a (19-2)th transistor including a gate electrode connected to the first input terminal, a first electrode connected to a second electrode of the (19-1)th transistor, and a second electrode connected to the third node; a (20-1)th transistor including a gate electrode connected to the second node, a first electrode configured to receive the first high voltage, and a second electrode; and a (20-2)th transistor including a gate electrode connected to the second node, a first electrode connected to a second electrode of the (20-1)th transistor, and a second electrode connected to a second electrode of the (18-1)th transistor and a second electrode of the (19-1)th transistor.

The second output terminal may output the first low voltage or the clock signal.

The third output terminal may output the first low voltage or the clock signal, and the clock signal output by the second output terminal and the clock signal output by the third output terminal may not overlap each other.

The emission driver and the display device including the same according to embodiments of the present disclosure may supply emission signals having uniform duty ratios.

DETAILED DESCRIPTION OF THE EMBODIMENTS

Figure 1:
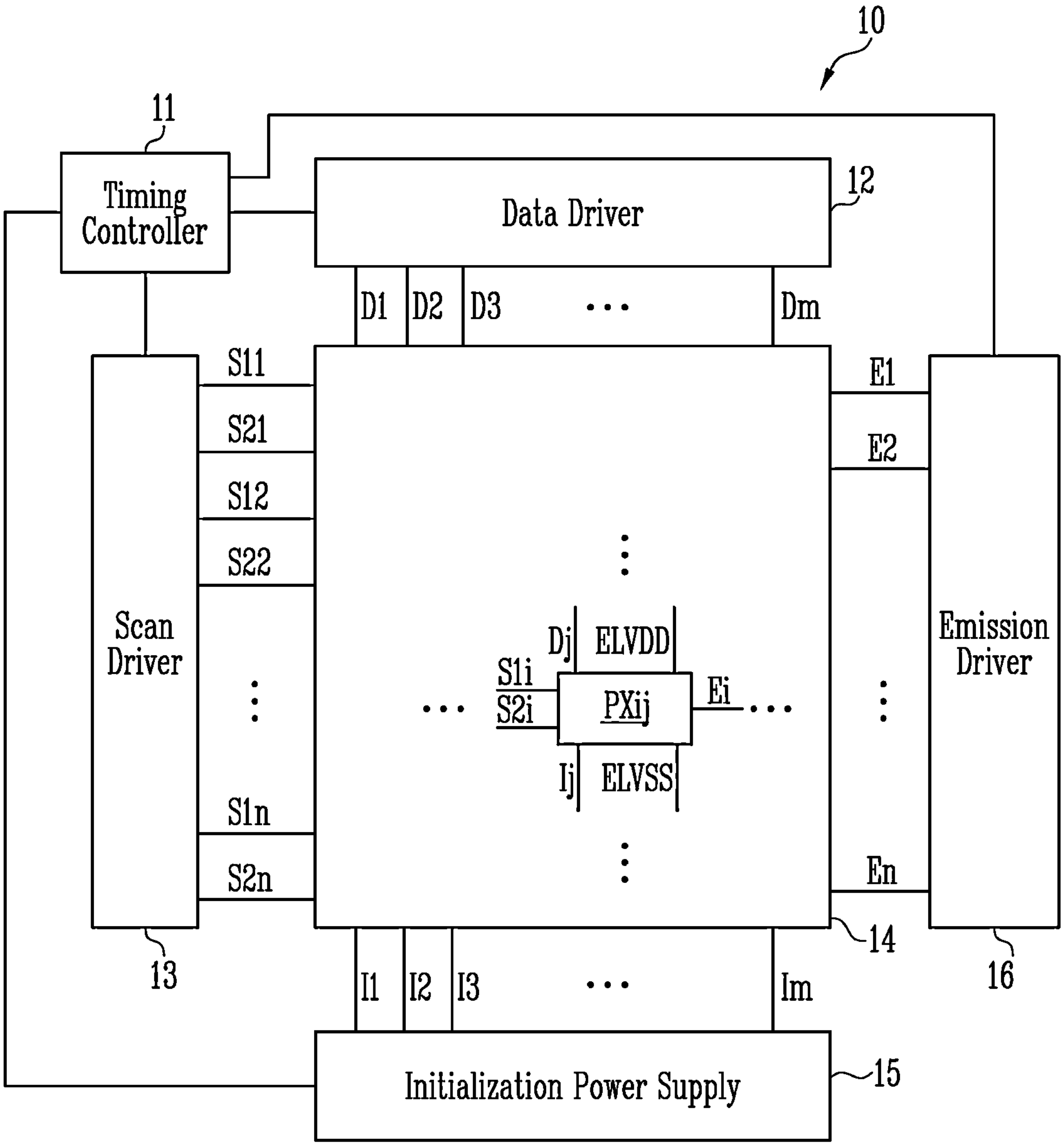
FIG. 1 is a view illustrating a display device according to an embodiment of the present disclosure.

Hereinafter, with reference to the accompanying drawings, various embodiments of the present disclosure will be described in detail so that a person having ordinary knowledge in the art to which the present disclosure pertains could easily put the present disclosure into practice. The present disclosure may be implemented in various different forms and is not limited to the embodiments described herein.

The parts not relating to the description are omitted for the sake of brevity of the present disclosure, and the same reference numerals will refer to the same or similar parts throughout the specification. Thus, reference signs described before may also be used in other figures.

In addition, sizes and thicknesses of respective elements in the drawings are arbitrarily illustrated for convenience of understanding, and the present disclosure is not limited to those illustrated in the drawings. In the drawings, the thicknesses of layers and areas may be exaggerated for clarity of description.

In addition, the expression "the same" used herein may mean "substantially the same". That is, when two objects are referred to as being "the same", a person having ordinary skill in the art will not see any significant difference between the two objects. Other expressions may also be expressions in which "substantially" is omitted.

FIG. 1 is a view illustrating a display device according to an embodiment of the present disclosure.

Referring to FIG. 1, a display device 10 according to an embodiment of the present disclosure includes a timing controller 11, a data driver 12, a scan driver 13, a pixel part 14, an initialization power supply 15, and an emission driver 16.

The timing controller 11 may receive frame information and control signals from an external processor. The timing controller 11 may convert the received frame information and control signals according to the specification of the display device and provide the data driver 12, the scan driver 13, and the emission driver 16 with the converted frame information and control signals. For example, the timing controller 11 may provide the data driver 12 with gradation values and control signals regarding respective pixels of the pixel part 14. In addition, the timing controller 11 may provide the scan driver 13 with control signals such as a clock signal and a clock start signal. In addition, the timing controller 11 may provide the emission driver 16 with control signals such as a clock signal and an emission stop signal.

The data driver 12 may generate data voltages to be provided to data lines D1, D2, D3, Dj, and Dm using the gradation values and the control signals received from the timing controller 11. Here, m may be an integer equal to or greater than 1.

The scan driver 13 may generate first scan signals to be provided to first scan lines S11, S12, S1*i*, and Sin and second scan signals to be provided to second scan lines S21, S22, S2*i*, and S2*n* by receiving control signals such as a clock signal and a scan start signal from the timing controller 11. Here, n may be an integer be equal to or greater than 1.

The emission driver 16 may generate an emission signal to be provided to emission lines E1, E2, Ei, and En by receiving control signals such as a clock signal and an emission stop signal from the timing controller 11.

The initialization power supply 15 may supply an initialization voltage to initialization lines I1, I2, I3, Ij, and Im.

The pixel part 14 includes pixels. For example, a pixel PXij may be connected to corresponding lines including a data line Dj, a first scan line S1*i*, a second scan line S2*i*, an emission line Ei, and an initialization line Ij. In addition, the pixel PXij may be connected to a first power line ELVDD and a second power line ELVSS.

Figure 2:
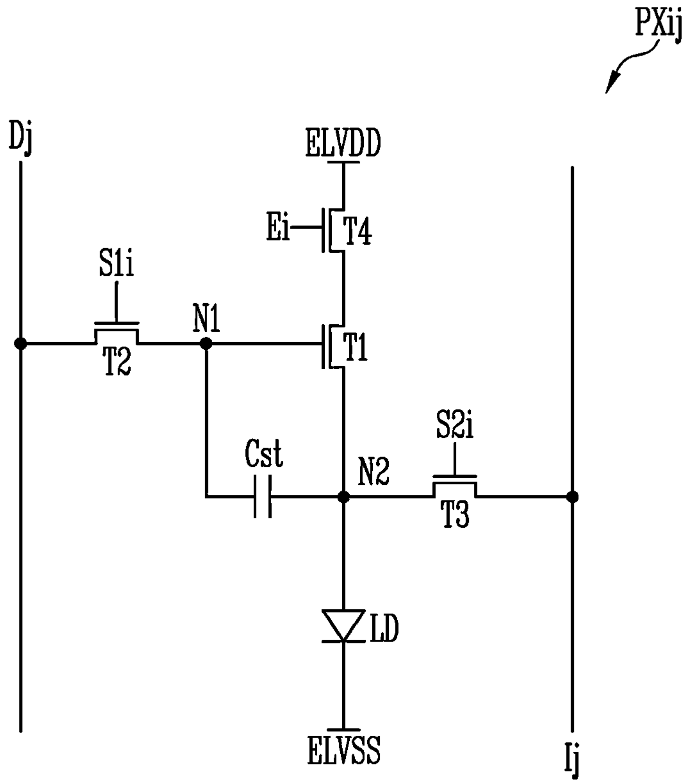
FIG. 2 is a view illustrating a pixel according to an embodiment of the present disclosure.

FIG. 2 is a view illustrating a pixel according to an embodiment of the present disclosure.

Referring to FIG. 2, the pixel PXij according to an embodiment of the present disclosure may include transistors T1, T2, T3, and T4, a storage capacitor Cst, and a light-emitting diode LD.

Although it will be assumed hereinafter that the transistors T1 to T4 are respectively implemented using an N-type transistor (e.g., an NMOS), a person having ordinary knowledge in the art to which the present disclosure pertains may respectively implement the transistors T1 to T4 using a P-type transistor (e.g., a PMOS) or a combination of an N-type transistor and a P-type transistor.

The first transistor T1 may have a gate electrode connected to a first node N1, one electrode connected to a second node N2, and the other electrode connected to one electrode of the fourth transistor T4. The first transistor T1 may be referred to as a driver transistor.

The second transistor T2 may have a gate electrode connected to the first scan line S1*i*, one electrode connected to the data line Dj, and the other electrode connected to the first node N1. The second transistor T2 may be referred to as a scan transistor, a switching transistor, or the like.

The third transistor T3 may have a gate electrode connected to the second scan line S2*i*, one electrode connected to the second node N2, and the other electrode connected to the initialization line Ij. The third transistor T3 may be referred to as an initialization transistor.

The fourth transistor T4 may have a gate electrode connected to the emission line Ei, one electrode connected to the other electrode of the first transistor T1, and the other electrode connected to the first power line ELVDD.

The storage capacitor Cst may have one electrode connected to the first node N1 and the other electrode connected to the second node N2.

The light-emitting diode LD may have an anode connected to the second node N2 and a cathode connected to the second power line ELVSS. The light-emitting diode LD may be implemented as an organic light-emitting diode (OLED), an inorganic light-emitting diode, a quantum dot light-emitting diode, or the like.

In addition, although a single light-emitting diode LD is illustrated in FIG. 2, the light-emitting diode LD may be implemented as a plurality of microscopic light-emitting diodes. For example, the plurality of microscopic light-emitting diodes may be arranged in parallel with the same polarities or with different polarities.

Figure 3:
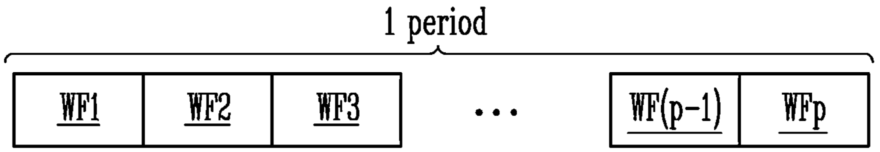
FIG. 3 is a view illustrating a case in which the display device is driven at a normal frequency.

FIG. 3 is a view illustrating a case in which a display device is driven at a normal frequency (or an operating frequency).

When the driving frequency of the display device 10 is a normal frequency (a normal frequency mode), a single period may include a plurality of scan periods WF1, WF2, WF3, WF(p−1), and WFp. P may be an integer equal to or greater than 1. For example, when the single period is 1 second and the driving frequency is 60 Hz, p may be 60. Here, each of the scan periods WF1, WF2, WF3, WF(p−1), and WFp may correspond to a frame period. For example, the single period may include 60 frame periods.

Each of the pixels may be provided with a corresponding data voltage during each of the scan periods WF1, WF2, WF3, WF(p−1), and WFp. For example, when p is 60, the data voltage of each of the pixels may be updated 60 times during the single period.

Figure 4:
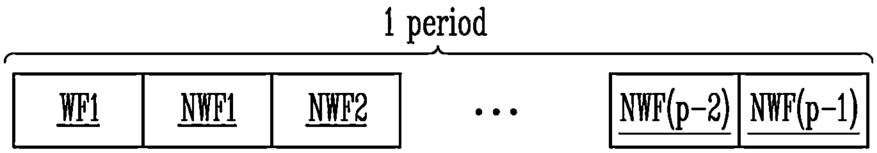
FIG. 4 is a view illustrating a case in which the display device is driven at a low frequency.

FIG. 4 is a view illustrating a case in which the display device is driven at a low frequency.

When the driving frequency of the display device 10 is a low frequency (low frequency mode), the single period may include a single scan period WF1 and subsequent self-scan periods NWF1, NWF2, NWF(p−2), and NWF(p−1). For example, when the single period may be 1 second and the driving frequency is 1 Hz, p may be 60. Here, the signal period may correspond to a single frame period.

Each of the pixels may be provided with a corresponding data voltage during the scan period WF1. Each of the pixels may not be provided with a data voltage during the self-scan periods NWF1 to NWF (p−1). Thus, when p is 60, the data voltage each of the pixels may be updated one time during the single period.

Figure 5:
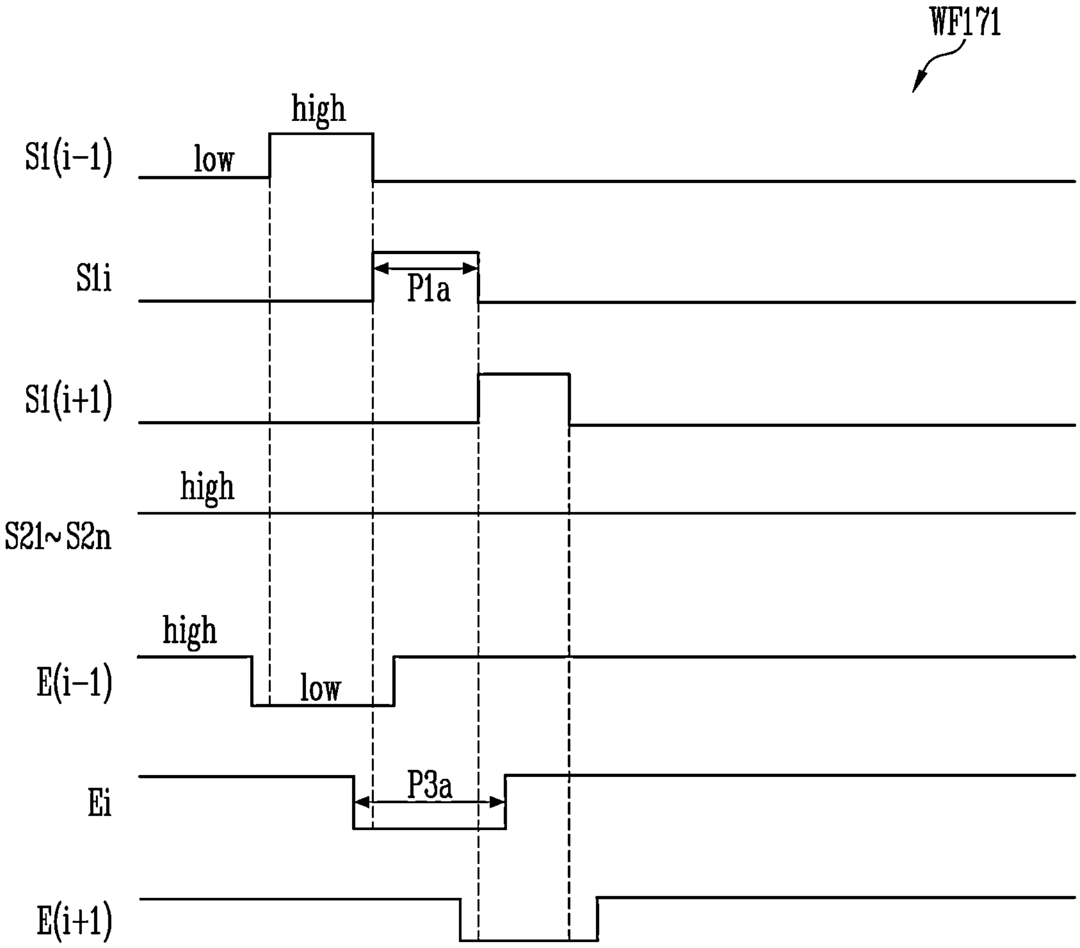
FIGS. 5 and 6 are timing diagrams illustrating a pixel driving method.
Figure 6:
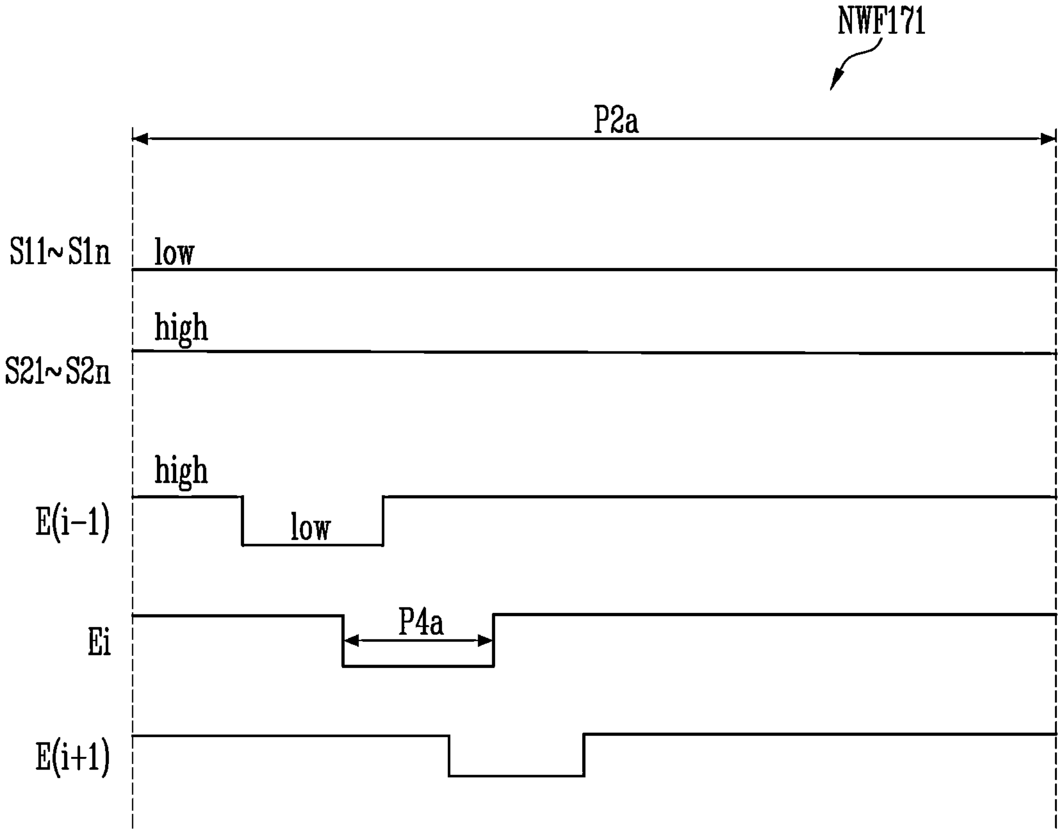

FIGS. 5 and 6 are timing diagrams illustrating a pixel driving method.

Referring to FIG. 5, during a first period P1*a* of a scan period WF171, a first scan signal having a turn-on level (e.g., a logic high level) may be applied to the first scan line S1*i*, a data voltage may be applied to the data line Dj, and a second scan signal having a turn-on level may be applied to the second scan line S2*i*.

An emission signal having a turn-off level (e.g., a logic low level) may be applied to the emission line Ei during a third period P3*a* of the scan period WF171. The third period P3*a* may be a period including the first period P1*a*. The light-emitting diode LD may generate light at a brightness based on the data voltage when the emission signal having a turn-on level is applied to the emission line Ei. The light-emitting diode LD may be in a non-emitting state when the emission signal having a turn-off level is applied to the emission line Ei.

First scan signals having a turn-on level may be sequentially supplied to first can lines S1(*i*−1), S1*i*, and S1(*i*+1) during the scan period WF171. In addition, second scan signals having a turn-on level may be maintained in second scan lines S21 to S2*n*. In another embodiment, the second scan signals having a turn-on level may be sequentially supplied to the second scan lines S21 to S2*n*. Here, the second scan signals having a turn-on level may be synchronized with the first scan signals having a turn-on level.

For example, when a first scan signal having a turn-on level is applied to the first scan line S1*i*, the second transistor T2 of the pixel PXij is turned on and a data voltage is applied to the first node N1. In addition, when a second scan signal having a turn-on level is applied to the second scan line S2*i*, the third transistor T3 of the pixel PXij is turned on and the initialization voltage is applied to the second node N2. Consequently, the storage capacitor Cst may store therein the difference in the voltage between the first node N1 and the second node N2. Here, since the emission signal having a turn-on level is being applied to the emission line Ei, the fourth transistor T4 may be in a turned-off state, and driving current does not flow from the first power line ELVDD to the second power line ELVSS. Consequently, the light-emitting diode LD is in a non-emitting state.

Next, an emission signal having a turn-on level is applied to the emission line Ei. The fourth transistor T4 is in a turned-on state, and driving current may flow from the first power line ELVDD to the second power line ELVSS. Here, the amount of driving current is adjusted by the first transistor T1 according to the voltage difference stored in the storage capacitor Cst. Thus, the light-emitting diode LD may generate light at a brightness proportional to the amount of driving current. Here, the second transistor T2 is in a turned-off state, and thus the storage capacitor Cst with the first node N1 being floated may maintain the stored voltage difference.

Referring to FIG. 6, during a second period P2*a* of a self-scan period NWF171, a first scan signal having a turn-off level may be applied to the first scan line S1*i* and a second scan signal having a turn-on level may be applied to the second scan line S2*i*. An emission signal having a turn-off level may be applied to the emission line Ei during a fourth period P4*a* of the self-scan period NWF171. The second period P2*a* may be a period including the fourth period P4*a*.

The self-scan period NWF171 may be a period following the scan period WF171. During at least a portion of the scan period WF171 and the self-scan period NWF171, the light-emitting diode LD may generate light at a brightness based on the data voltage provided in the scan period WF171.

During the self-scan period NWF171, first scan signals having a turn-off level may be maintained on the first can lines S1(*i*−1), S1*i*, and S1(*i*+1). In addition, second scan signals having a turn-on level may be maintained on the second scan lines S21 to S2*n*.

Figure 7:
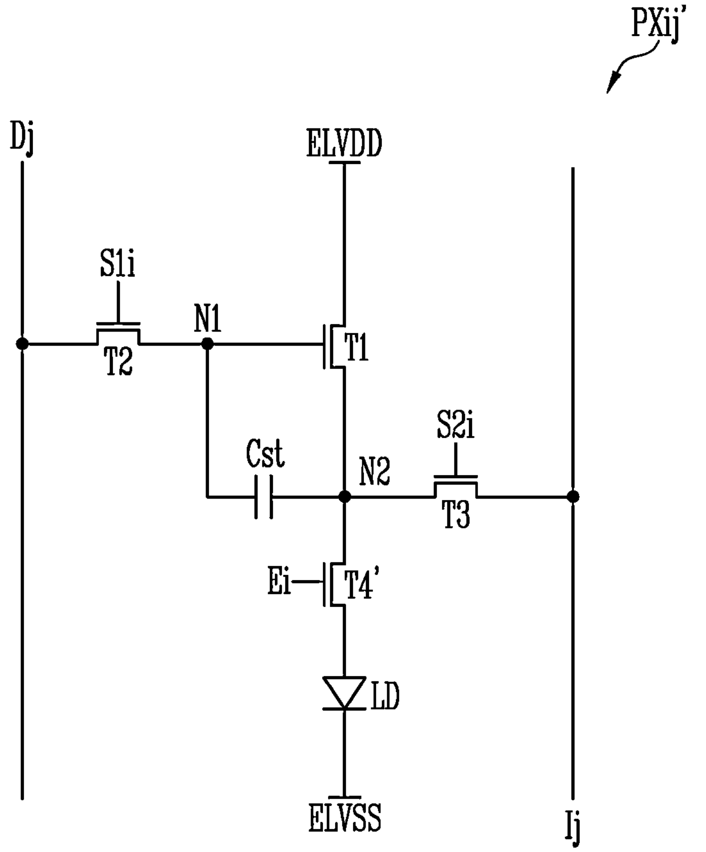
FIG. 7 is a view illustrating a pixel according to another embodiment of the present disclosure.

FIG. 7 is a view illustrating a pixel according to another embodiment of the present disclosure.

In a pixel PXij' illustrated in FIG. 7, the position of a fourth transistor T4' is changed compared to the pixel PXij illustrated in FIG. 2. The fourth transistor T4' may be located between a second node N2 and a light-emitting diode LD. Other configurations and driving methods of the pixel PXij' are the same as those of the pixel PXij illustrated in FIG. 2, and thus a description thereof will be omitted.

Figure 8:
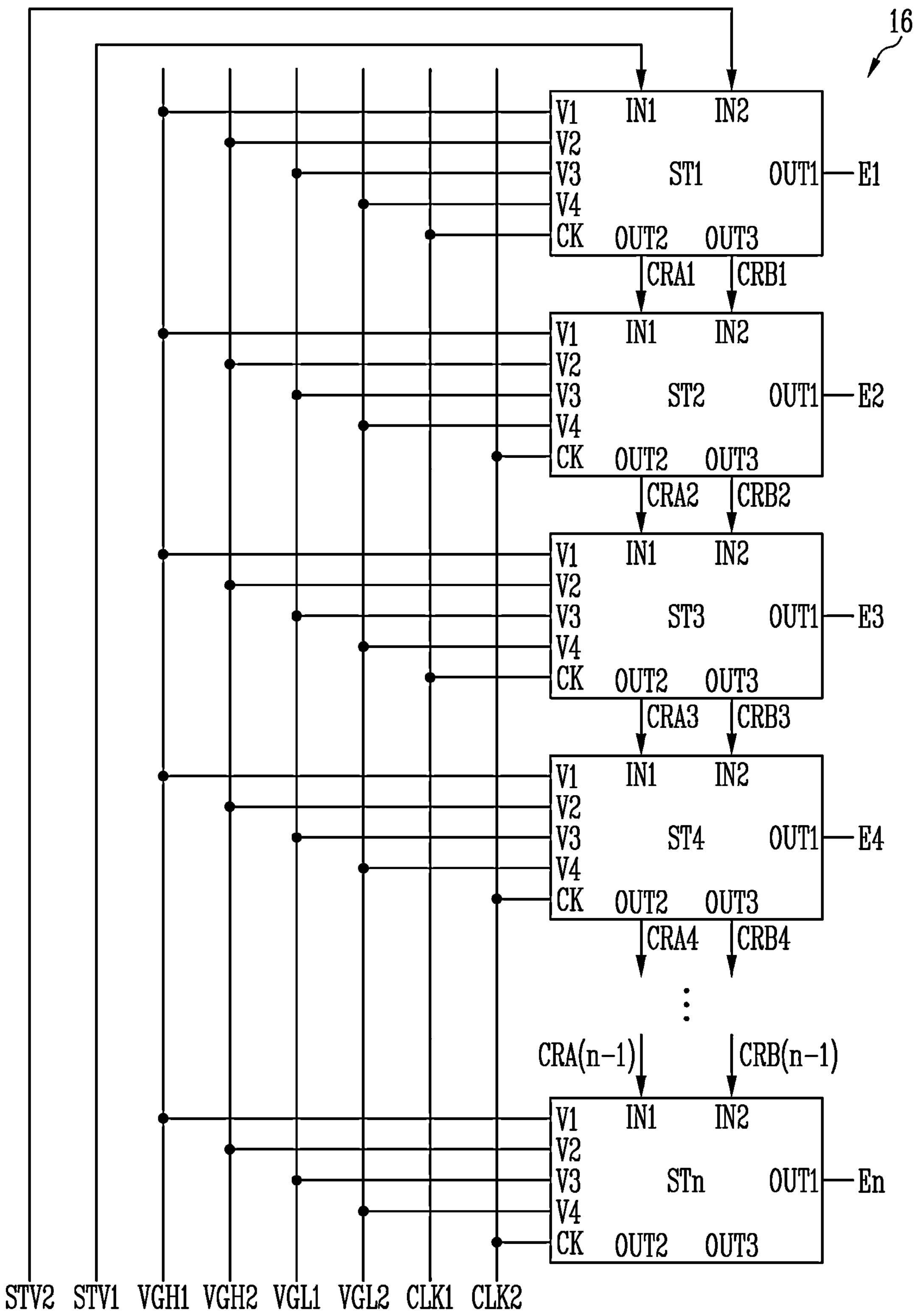
FIG. 8 is a view illustrating the emission driver according to an embodiment of the present disclosure.

FIG. 8 is a view illustrating the emission driver according to an embodiment of the present disclosure.

Referring to FIG. 8, the emission driver 16 according to an embodiment of the present disclosure may include a plurality of stages ST1, ST2, ST3, ST4, and STn.

Each of the stages ST1, ST2, ST3, ST4, and STn may include a first input terminal IN1, a second input terminal IN2, a first voltage terminal V1, a second voltage terminal V2, a third voltage terminal V3, a fourth voltage terminal V4, a clock terminal CK, a first output terminal OUT1, a second output terminal OUT2, and a third output terminal OUT3.

The emission driver 16 may be implemented as a shift register. The first stage ST1 may receive a first emission stop signal STV1 by the first input terminal IN1 and receive a second emission stop signal STV2 by the second input terminal IN2. In addition, the first stage ST1 may output an emission signal having a turn-off level by the first output terminal OUT1 connected to an emission line E1, output a first carry signal CRA1 by the second output terminal OUT2, and output a second carry signal CRB1 by the third output terminal OUT3, based on the first emission stop signal STV1 and the second emission stop signal STV2. The second stage ST2 may receive the first carry signal CRA1 by the first input terminal IN1 and receive the second carry signal CRB1 by the second input terminal IN2. In addition, the second stage ST2 may output an emission signal having a turn-off level by the first output terminal OUT1 connected to an emission line E2, output a first carry signal CRA2 by the second output terminal OUT2, and output a second carry signal CRB2 by the third output terminal OUT3, based on the first carry signal CRA1 and the second carry signal CRB1. In this manner, as the first carry signals CRA2, CRA3, CRA4, and CRA(n−1) and the second carry signals CRB2, CRB3, CRB4, and CRB(n−1) are sequentially transferred to the last nth stage STn through the third stage ST3 and the fourth stage ST4, the emission signals having a turn-off level may be sequentially applied to the emission lines E3, E4, and En.

The odd number stages ST1 and ST3 may receive a first clock signal CLK1 by the clock terminal CK. The even number stages ST2, ST4, . . . , and STn may receive a second clock signal CLK2 by the clock terminal CK.

The stages ST1, ST2, ST3, ST4, and STn may receive a first high voltage VGH1 by the first voltage terminal V1, receive a second high voltage VGH2 by the second voltage terminal V2, receive a first low voltage VGL1 by the third voltage terminal V3, and receive a second low voltage VGL2 by the fourth voltage terminal V4. The first high voltage VGH1 and the second high voltage VGH2 may be set the same as or different from each other. The first low voltage VGL1 and the second low voltage VGL2 may be set the same as or different from each other.

Figure 9:
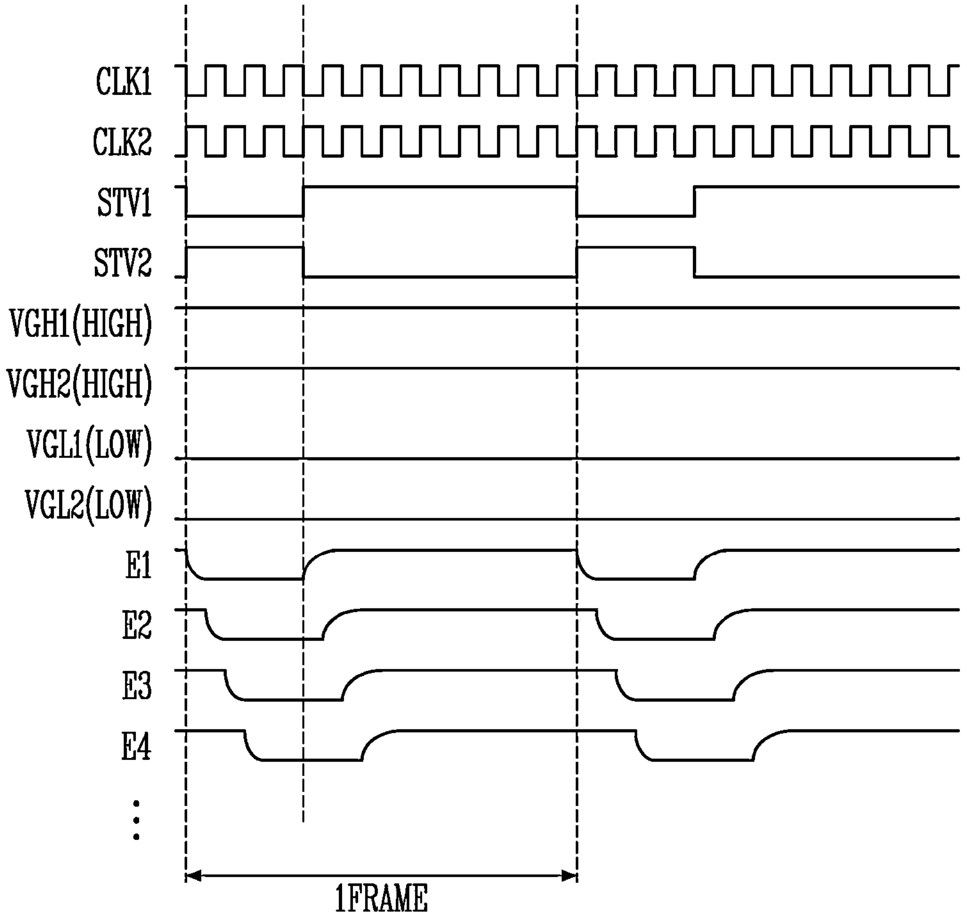
FIG. 9 is a timing diagram illustrating a method of driving the emission driver illustrated in FIG. 8.

FIG. 9 is a timing diagram illustrating a method of driving the emission driver illustrated in FIG. 8.

Pulses (having a logic high level) of the first clock signal CLK1 and the second clock signal CLK2 may not overlap each other. The first clock signal CLK1 and second clock signal CLK2 may be 180 degrees out of phase. For example, the second clock signal CLK2 may be an inverse signal of the first clock signal CLK1. The second emission stop signal STV2 may be an inverse signal of the first emission stop signal STV1.

When the first emission stop signal STV1 having a turn-off level is supplied to the first stage ST1, the first stage ST1 may supply an emission signal having a turn-off level to the emission line E1. Here, all pixels connected to the emission line E1 may be converted to a non-emitting state. Afterwards, when the first emission stop signal STV1 having a turn-on level is supplied to the first stage ST1, the first stage ST1 may supply an emission signal having a turn-on level to the emission line E1. Here, all pixels connected to the emission line E1 may be converted to an emitting state. A sum of a single non-emitting state period and a single emitting state period may be a single frame period 1FRAME.

As described above, as the carry signals are sequentially transferred, the emission signals having a turn-off level may be sequentially supplied to the emission lines E2, E3, E4, and . . .

Figure 10:
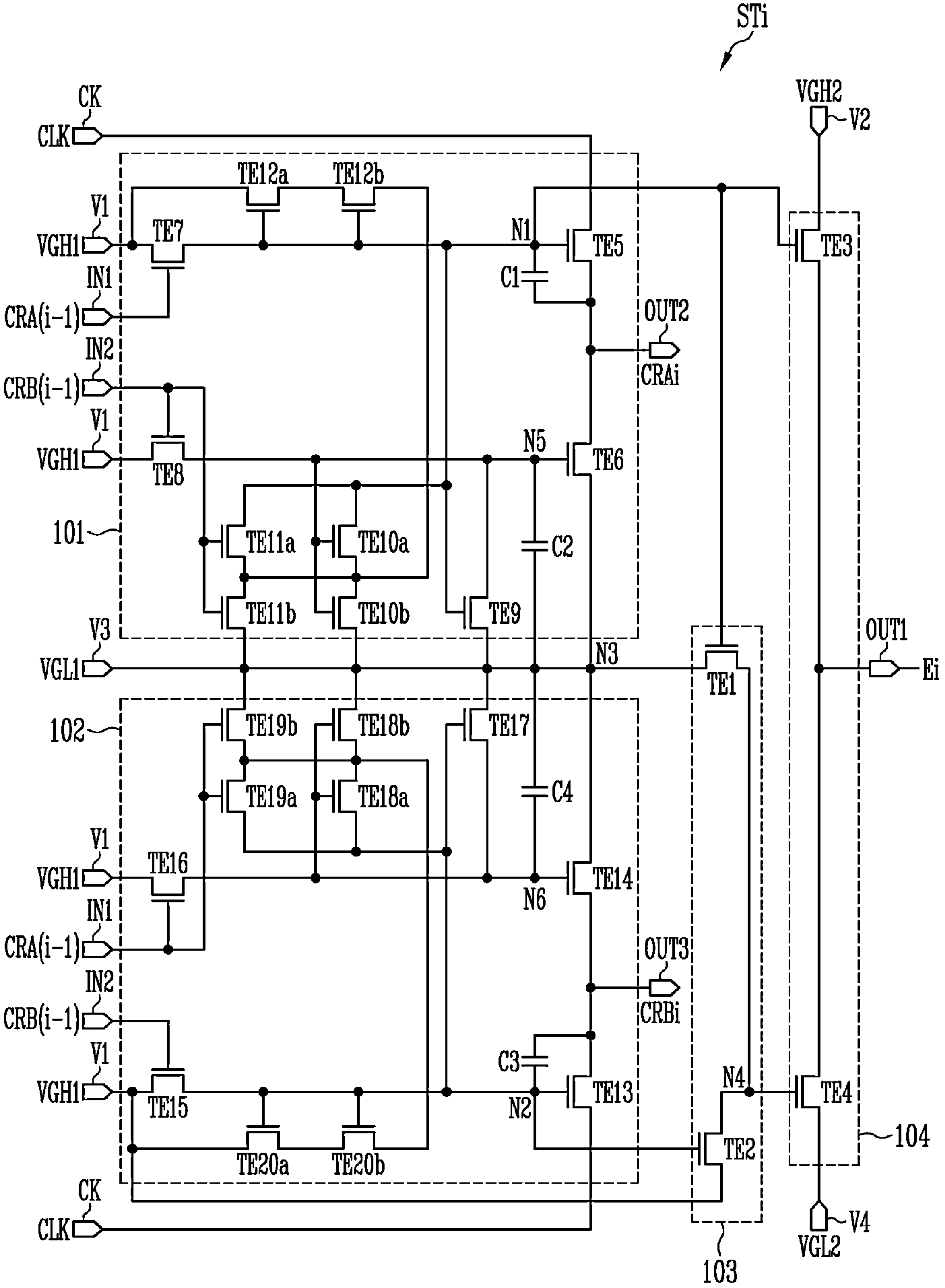
FIG. 10 is a view illustrating a stage of the emission driver according to an embodiment of the present disclosure.
Figure 11:
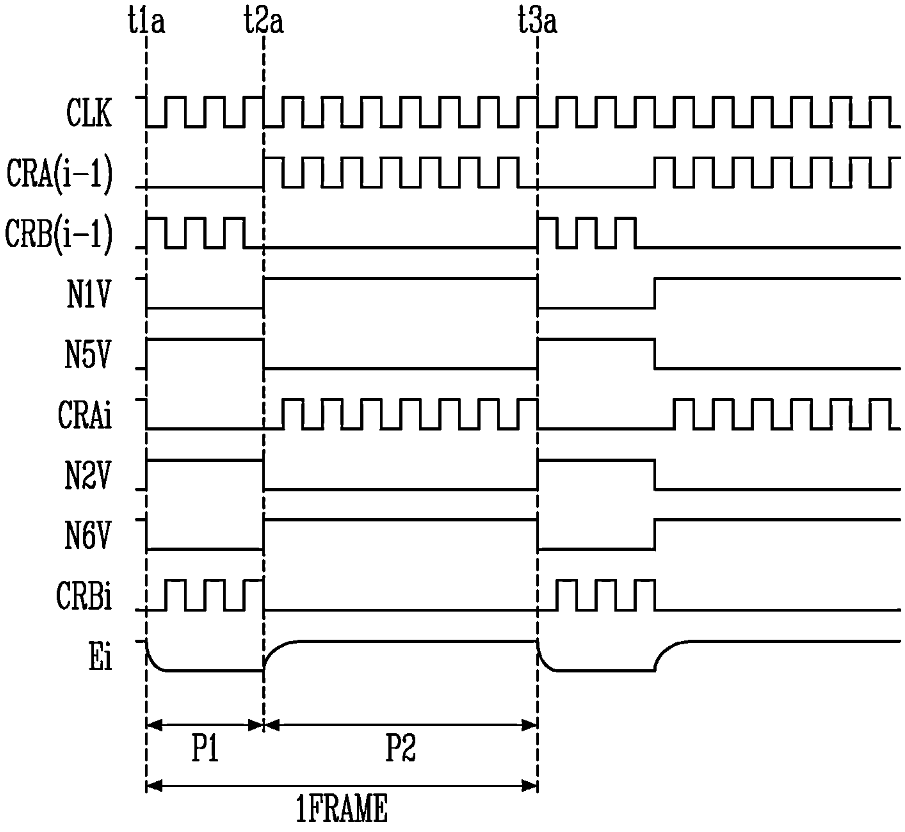
FIG. 11 is a timing diagram illustrating the operation of the stage illustrated in FIG. 10.

FIG. 10 is a view illustrating a stage of the emission driver according to an embodiment of the present disclosure. FIG. 11 is a timing diagram illustrating the operation of the stage illustrated in FIG. 10.

Referring to FIG. 10, a stage STi may include a first circuit part 101, a second circuit part 102, a third circuit part 103, and a fourth circuit part 104.

With reference to FIGS. 10 and 11, the first circuit part 101 may apply a first node voltage N1V to a first node N1. The second circuit part 102 may apply a second node voltage N2V to the second node N2 and be connected to the first circuit part 101 through a third node N3. A first low voltage VGL1 may be applied to the third node N3.

With reference to FIG. 10, the first circuit part 101 and the second circuit part 102 may have circuit structures symmetrical about the third node N3. For example, the second circuit part 102 may include the same number of transistors and the same number of capacitors as the first circuit part 101. The connection relationship between the elements of the second circuit part 102 may be the same as the connection relationship between the elements of the first circuit part 101. The first circuit part 101 and the second circuit part 102 may receive the same input signals CLK, CRA(i−1), CRB(i−1), VGH1, and VGL1. For example, when the stage STi is an odd number stage, the clock signal CLK may be the first clock signal CLK1. When the stage STi is an even number stage, the clock signal CLK may be the second clock signal CLK2.

The third circuit part 103 may apply a third node voltage of the third node N3 or a voltage higher than the third node voltage to a fourth node N4, based on the first node voltage N1V and the second node voltage N2V.

The fourth circuit part 104 may generate an emission signal based on the first node voltage N1V and the fourth node voltage of the fourth node N4. The generated emission signal may be applied to the emission line Ei through the first output terminal OUT1.

The third circuit part 103 may include transistors TE1 and TE2. The first transistor TE1 may have a gate electrode connected to the first node N1, a first electrode connected to the third node N3, and a second electrode connected to the fourth node N4. The second transistor TE2 may have a gate electrode connected to the second node N2, a first electrode connected to the fourth node N4, and a second electrode configured to receive the first high voltage VGH1.

The fourth circuit part 104 may include transistors TE3 and TE4. The third transistor TE3 may have a gate electrode connected to the first node N1, a first electrode configured to receive the second high voltage VGH2, and a second electrode connected to the first output terminal OUT1. The fourth transistor TE4 may have a gate electrode connected to the fourth node N4, a first electrode connected to the first output terminal OUT1, and a second electrode configured to receive the second low voltage VGL2.

The first circuit part 101 may include transistors TE5 to TE12*b* and capacitors C1 and C2. A fifth transistor TE5 may have a gate electrode connected to the first node N1, a first electrode configured to receive the clock signal CLK, and a second electrode connected to the second output terminal OUT2. The first capacitor C1 may have a first electrode connected to the first node N1 and a second electrode connected to the second output terminal OUT2.

A sixth transistor TE6 may have a gate electrode connected to a fifth node N5, a first electrode connected to the second output terminal OUT2, and a second electrode connected to the third node N3. The second capacitor C2 may have a first electrode connected to the fifth node N5 and a second electrode connected to the third node N3. The second output terminal OUT2 may output the first low voltage VGL1 or the clock signal CLK as a first carry signal CRAi.

A seventh transistor TE7 may have a gate electrode connected to the first input terminal IN1, a first electrode configured to receive the first high voltage VGH1, and a second electrode connected to the first node N1. An eighth transistor TE8 may have a gate electrode connected to the second input terminal IN2, a first electrode configured to receive the first high voltage VGH1, and a second electrode connected to the fifth node N5. A ninth transistor may have a gate electrode connected to the first node N1, a first electrode connected to the fifth node N5, and a second electrode connected to the third node N3.

A (10-1)th transistor TE10*a* may have a gate electrode connected to the fifth node N5, a first electrode connected to the first node N1, and a second electrode. A (10-2)th transistor TE10*b* may have a gate electrode connected to the fifth node N5, a first electrode connected to the second electrode of the (10-1)th transistor TE10*a*, and a second electrode connected to the third node N3.

A (11-1)th transistor TE11*a* may have a gate electrode connected to the second input terminal IN2, a first electrode connected to the first node N1, and a second electrode. A (11-2)th transistor TE11*b* may have a gate electrode connected to the second input terminal IN2, a first electrode connected to the second electrode of the (11-1)th transistor TE11*a*, and a second electrode connected to the third node N3.

A (12-1)th transistor TE12*a* may have a gate electrode connected to the first node N1, a first electrode configured to receive the first high voltage VGH1, and a second electrode. A (12-2)th transistor TE12*b* may have a gate electrode connected to the first node N1, a first electrode connected to the second electrode of the (12-1)th transistor TE12*a*, and a second electrode connected to the second electrode of the (10-1)th transistor TE10*a* and the second electrode of the (11-1)th transistor TE11*a*.

The second circuit part 102 may include transistors TE13 to TE20*b* and capacitors C3 and C4. A thirteenth transistor TE13 may have a gate electrode connected to the second node N2, a first electrode configured to receive the clock signal CLK, and a second electrode connected to the third output terminal OUT3. The third capacitor C3 may have a first electrode connected to the second node N2 and a second electrode connected to the third output terminal OUT3.

A fourteenth transistor TE14 may have a gate electrode connected to the sixth node N6, a first electrode connected to the third output terminal OUT3, and a second electrode connected to the third node N3. The fourth capacitor C4 may have a first electrode connected to the sixth node N6 and a second electrode connected to the third node N3. The third output terminal OUT3 may output the first low voltage VGL1 or the clock signal CLK. The clock signal CLK output by the second output terminal OUT2 and the clock signal CLK output by the third output terminal OUT3 may not overlap in time.

A fifteenth transistor TE15 may have a gate electrode connected to the second input terminal IN2, a first electrode configured to receive the first high voltage VGH1, and a second electrode connected to the second node N2. A sixteenth transistor TE16 may have a gate electrode connected to the first input terminal IN1, a first electrode configured to receive the first high voltage VGH1, and a second electrode connected to the sixth node N6. A seventeenth transistor TE17 may have a gate electrode connected to the second node N2, a first electrode connected to the sixth node N6, and a second electrode connected to the third node N3.

An (18-1)th transistor TE18*a* may have a gate electrode connected to the sixth node N6, a first electrode connected to the second node N2, and a second electrode. An (18-2)th transistor TE18*b* may have a gate electrode connected to the sixth node N6, a first electrode connected to the second electrode of the (18-1)th transistor TE18*a*, and a second electrode connected to the third node N3.

A (19-1)th transistor TE19*a* may have a gate electrode connected to the first input terminal IN1, a first electrode connected to the second node N2, and a second electrode. A (19-2)th transistor TE19*b* may have a gate electrode connected to the first input terminal IN1, a first electrode connected to the second electrode of the (19-1)th transistor TE19*a*, and a second electrode connected to the third node N3.

A (20-1)th transistor TE20*a* may have a gate electrode connected to the second node N2, a first electrode configured to receive the first high voltage VGH1, and a second electrode. A (20-2)th transistor TE20*b* may have a gate electrode connected to the second node N2, a first electrode connected to the second electrode of the (20-1)th transistor TE20*a*, and a second electrode connected to the second electrode of the (18-1)th transistor TE18*a* and the second electrode of the (19-1)th transistor TE19*a*.

With reference to FIG. 11, the operation of the stage STi illustrated in FIG. 11 will be described. First, at a time point t1*a*, the second carry signal CRB(i−1) received in the (i−1)th stage includes a clock signal out of phase from the clock signal CLK. Here, the first carry signal CRA(i−1) received in the (i−1)th stage may correspond to the first low voltage VGL1. The eighth transistor TE8 may be turned on based on the second carry signal CRB(i−1), and a fifth node voltage N5V of the fifth node N5 may be the first high voltage VGH1. Here, since the fifth node voltage N5V is maintained by the second capacitor C2, the fifth node voltage N5V may maintain a high level even if the second carry signal CRB (i−1) has a low level and thus the eighth transistor TE8 is turned off. Consequently, the sixth transistor TE6 may be turned on, and the first low voltage VGL1 may be applied to the second output terminal OUT2 as the first carry signal CRAi.

As the fifth node voltage N5V has a high level, the (10-1)th and the (10-2)th transistors TE10*a* and TE10*b* may be turned on, and the first low voltage VGL1 may be applied to the first node N1. In addition, in response to the second carry signal CRB(i−1), the (11-1)th and (11-2)th transistors TE11a and TE11b are repeatedly turned on, and thus the first low voltage VGL1 may be applied to the first node N1. Thus, the first node voltage N1V may have a low level.

In addition, based on the second carry signal CRB(i−1), the fifteenth transistor TE15 may be turned on, and the second node voltage N2V of the second node N2 may be the first high voltage VGH1. Here, the (20-1) and (20-2) the transistors TE20a and TE20b may be turned on and thus the first high voltage VGH1 may be applied to the second electrodes of the (18-1)th and (19-1)th transistors TE18a and TE19a. Thus, leakage current through the (18-1)th and (19-1)th transistors TE18a and TE19a may be prevented and thus the voltage of the second node N2 may be maintained at a high level. As the second node voltage N2V has a high level, the thirteenth transistor TE13 may be turned on, and the clock signal CLK may be applied to the third output terminal OUT3 as the second carry signal CRBi). In addition, as the seventeenth transistor TE17 is turned on, the sixth node voltage N6V of the sixth node N6 may be the first low voltage VGL1.

In addition, the second transistor TE2 is turned on by the second node voltage N2V having a high level, and the first high voltage VGH1 is applied to the fourth node N4. Consequently, the difference between the gate voltage and the source voltage of the fourth transistor TE4 may be stably maintained, and the voltage of the first output terminal OUT1 may be rapidly discharged to the second low voltage VGL2. That is, the emission signal on the emission line Ei may be rapidly discharged to a low level. According to the present embodiment, the voltage drop rate reduced by the parasitic capacitance between the fourth node N4 and the first output terminal OUT1 may be compensated for. If there is not the second transistor TE2, as the process moves to the subsequent stages, the duty ratios of the second carry signals CRBi and the emission signals may unintentionally and gradually increase. According to the present embodiment including the second transistor TE2, the display device 10 may supply emission signals having uniform duty ratios.

At a time point t2a, the first carry signal CRA−(i−1) received in the (i−1)th stage includes a clock signal out of phase from the clock signal CLK. Here, the second carry signal CRB(i−1) received in the (i−1)th stage may correspond to the first low voltage VGL1. The sixteenth transistor TE16 may be turned on based on the first carry signal CRA(i−1), and the sixth node voltage N6V may be the first high voltage VGH1. Here, since the sixth node voltage N6V is maintained by the fourth capacitor C4, the sixth node voltage N6V may maintain a high level when the first carry signal CRA(i−1) has a low level and thus the sixteenth transistor TE16 is turned off. Consequently, the fourteenth transistor TE14 may be turned on and the first low voltage VGL1 may be applied to the third output terminal OUT3 as the second carry signal CRBi.

As the sixth node voltage N6V has a high level, the (18-1)th and (18-2)th transistors TE18a and TE18b may be turned on, and thus the first low voltage VGL1 may be applied to the second node N2. In addition, in response to the first carry signal CRA(i−1), the (19-1)th and (19-2)th transistors TE19a and TE19b may be turned on and thus the first low voltage VGL1 may be applied to the second node N2. Consequently, the second node voltage N2V may have a low level.

In addition, the seventh transistor TE7 may be turned on based on the first carry signal CRA(i−1), and the first node voltage N1V of the first node N1 may be the first high voltage VGH1. Here, the (12-1)th and (12-2)th transistors TE12a and TE12b may be turned on, and thus the first high voltage VGH1 may be applied to the second electrodes of the (10-1)th and (11-1)th transistors TE10a and TE11a. Thus, leakage current through the (10-1)th and (11-1)th transistors TE10a and TE11a may be prevented and thus the voltage of the first node N1 may be maintained at a high level. As the voltage of the first node N1 has a high level, the fifth transistor TE5 may be turned on, and the clock signal CLK may be applied to the second output terminal OUT2 as the first carry signal CRAi. In addition, as the ninth transistor TE9 is turned on, the fifth node voltage N5V of the fifth node N5 may be the first low voltage VGL1.

In addition, the first transistor TE and the third transistor TE3 may be turned on by the first node voltage N1V having a high level. The turned-on first transistor TEL may turn off the fourth transistor TE4 by supplying the first low voltage VGL1 to the fourth node N4. The turned-on third transistor TE3 may apply the second high voltage VGH2 to the first output terminal OUT1 as an emission signal.

At a time point t3a, the same driving method as at the time point t1a is repeated. Thus, a repeated description of the subsequent process will be omitted. A sum of a period P1 in which the emission signal has a low level and a period P2 in which the emission signal has a high level may correspond to the single frame period 1FRAME.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. An emission driver comprising stages,
wherein each of the stages comprises:
a first circuit part configured to apply a first node voltage to a first node;
a second circuit part configured to apply a second node voltage to a second node and directly connected to the first circuit part through a third node;
a third circuit part configured to apply a third node voltage of the third node or a voltage higher than the third node voltage to a fourth node based on the first node voltage and the second node voltage; and
a fourth circuit part configured to generate an emission signal based on the first node voltage and a fourth node voltage of the fourth node,
wherein the first circuit part and the second circuit part have circuit structures symmetrical about the third node.

2. The emission driver of claim 1, wherein the first circuit part and the second circuit part receive same input signals.

3. The emission driver of claim 1, wherein the third circuit part comprises:
a first transistor comprising a gate electrode connected to the first node, a first electrode connected to the third node, and a second electrode connected to the fourth node; and
a second transistor comprising a gate electrode connected to the second node, a first electrode connected to the fourth node, and a second electrode configured to receive a first high voltage.

4. The emission driver of claim 3, wherein the third node voltage is a first low voltage.

5. The emission driver of claim 4, wherein the fourth circuit part comprises:

a third transistor comprising a gate electrode connected to the first node, a first electrode configured to receive a second high voltage, and a second electrode connected to a first output terminal configured to output the emission signal; and a fourth transistor comprising a gate electrode connected to the fourth node, a first electrode connected to the first output terminal, and a second electrode configured to receive a second low voltage.

6. The emission driver of claim 5, wherein the first circuit part comprises:

a fifth transistor comprising a gate electrode connected to the first node, a first electrode configured to receive a clock signal, and a second electrode connected to a second output terminal;

a first capacitor comprising a first electrode connected to the first node and a second electrode connected to the second output terminal;

a sixth transistor comprising a gate electrode connected to a fifth node, a first electrode connected to the second output terminal, and a second electrode connected to the third node;

a second capacitor comprising a first electrode connected to the fifth node and a second electrode connected to the third node;

a seventh transistor comprising a gate electrode connected to a first input terminal, a first electrode configured to receive the first high voltage, and a second electrode connected to the first node;

an eighth transistor comprising a gate electrode connected to a second input terminal, a first electrode configured to receive the first high voltage, and a second electrode connected to the fifth node;

a ninth transistor comprising a gate electrode connected to the first node, a first electrode connected to the fifth node, and a second electrode connected to the third node;

a (10-1)th transistor comprising a gate electrode connected to the fifth node, a first electrode connected to the first node, and a second electrode;

a (10-2)th transistor comprising a gate electrode connected to the fifth node, a first electrode connected to the second electrode of the (10-1)th transistor, and a second electrode connected to the third node;

an (11-1)th transistor comprising a gate electrode connected to the second input terminal, a first electrode connected to the first node, and a second electrode;

an (11-2)th transistor comprising a gate electrode connected to the second input terminal, a first electrode connected to the second electrode of the (11-1)th transistor, and a second electrode connected to the third node;

an (12-1)th transistor comprising a gate electrode connected to the first node, a first electrode configured to receive the first high voltage, and a second electrode; and a (12-2)th transistor comprising a gate electrode connected to the first node, a first electrode connected to the second electrode of the (12-1)th transistor, and a second electrode connected to the second electrode of the (10-1)th transistor and the second electrode of the (11-1)th transistor.

7. The emission driver of claim 6, wherein the second circuit part comprises:

a thirteenth transistor comprising a gate electrode connected to the second node, a first electrode configured to receive the clock signal, and a second electrode connected to a third output terminal;

a third capacitor comprising a first electrode connected to the second node and a second electrode connected to the third output terminal;

a fourteenth transistor comprising a gate electrode connected to a sixth node, a first electrode connected to the third output terminal, and a second electrode connected to the third node;

a fourth capacitor comprising a first electrode connected to the sixth node and a second electrode connected to the third node;

a fifteenth transistor comprising a gate electrode connected to the second input terminal, a first electrode configured to receive the first high voltage, and a second electrode connected to the second node;

a sixteenth transistor comprising a gate electrode connected to the first input terminal, a first electrode configured to receive the first high voltage, and a second electrode connected to the sixth node;

a seventeenth transistor comprising a gate electrode connected to the second node, a first electrode connected to the sixth node, and a second electrode connected to the third node;

an (18-1)th transistor comprising a gate electrode connected to the sixth node, a first electrode connected to the second node, and a second electrode;

an (18-2)th transistor comprising a gate electrode connected to the sixth node, a first electrode connected to the second electrode of the (18-1)th transistor, and a second electrode connected to the third node;

a (19-1)th transistor comprising a gate electrode connected to the first input terminal, a first electrode connected to the second node, and a second electrode;

a (19-2)th transistor comprising a gate electrode connected to the first input terminal, a first electrode connected to the second electrode of the (19-1)th transistor, and a second electrode connected to the third node;

a (20-1)th transistor comprising a gate electrode connected to the second node, a first electrode configured to receive the first high voltage, and a second electrode; and a (20-2)th transistor comprising a gate electrode connected to the second node, a first electrode connected to the second electrode of the (20-1)th transistor, and a second electrode connected to the second electrode of the (18-1)th transistor and the second electrode of the (19-1)th transistor.

8. The emission driver of claim 7, wherein the second output terminal outputs the first low voltage or the clock signal.

9. The emission driver of claim 8, wherein the third output terminal outputs the first low voltage or the clock signal, and the clock signal output by the second output terminal and the clock signal output by the third output terminal do not overlap each other.

10. A display device comprising:

pixels; and stages configured to supply emission signals by which emission timings of the pixels are determined, wherein each of the stages comprises:

a first circuit part configured to apply a first node voltage to a first node;

a second circuit part configured to apply a second node voltage to a second node and directly connected to the first circuit part through a third node;

a third circuit part configured to apply a third node voltage of the third node or a voltage higher than the third node voltage to a fourth node based on the first node voltage and the second node voltage; and a fourth circuit part configured to generate the emission signals based on the first node voltage and a fourth node voltage of the fourth node, wherein the first circuit part and the second circuit part have circuit structures symmetrical about the third node.

11. The display device of claim 10, wherein the first circuit part and the second circuit part receive same input signals.

12. The display device of claim 10, wherein the third circuit part comprises:

a first transistor comprising a gate electrode connected to the first node, a first electrode connected to the third node, and a second electrode connected to the fourth node; and a second transistor comprising a gate electrode connected to the second node, a first electrode connected to the fourth node, and a second electrode configured to receive a first high voltage.

13. The display device of claim 12, wherein the third node voltage is a first low voltage.

14. The display device of claim 13, wherein the fourth circuit part comprises:

a third transistor comprising a gate electrode connected to the first node, a first electrode configured to receive a second high voltage, and a second electrode connected to a first output terminal configured to output the emission signals; and a fourth transistor comprising a gate electrode connected to the fourth node, a first electrode connected to the first output terminal, and a second electrode configured to receive a second low voltage.

15. The display device of claim 14, wherein the first circuit part comprises:

a fifth transistor comprising a gate electrode connected to the first node, a first electrode configured to receive a clock signal, and a second electrode connected to a second output terminal;

a first capacitor comprising a first electrode connected to the first node and a second electrode connected to the second output terminal;

a sixth transistor comprising a gate electrode connected to a fifth node, a first electrode connected to the second output terminal, and a second electrode connected to the third node;

a second capacitor comprising a first electrode connected to the fifth node and a second electrode connected to the third node;

a seventh transistor comprising a gate electrode connected to a first input terminal, a first electrode configured to receive the first high voltage, and a second electrode connected to the first node;

an eighth transistor comprising a gate electrode connected to a second input terminal, a first electrode configured to receive the first high voltage, and a second electrode connected to the fifth node;

a ninth transistor comprising a gate electrode connected to the first node, a first electrode connected to the fifth node, and a second electrode connected to the third node;

a (10-1)th transistor comprising a gate electrode connected to the fifth node, a first electrode connected to the first node, and a second electrode;

a (10-2)th transistor comprising a gate electrode connected to the fifth node, a first electrode connected to the second electrode of the (10-1)th transistor, and a second electrode connected to the third node;

an (11-1)th transistor comprising a gate electrode connected to the second input terminal, a first electrode connected to the first node, and a second electrode;

an (11-2)th transistor comprising a gate electrode connected to the second input terminal, a first electrode connected to the second electrode of the (11-1)th transistor, and a second electrode connected to the third node;

an (12-1)th transistor comprising a gate electrode connected to the first node, a first electrode configured to receive the first high voltage, and a second electrode; and a (12-2)th transistor comprising a gate electrode connected to the first node, a first electrode connected to the second electrode of the (12-1)th transistor, and a second electrode connected to the second electrode of the (10-1)th transistor and the second electrode of the (11-1)th transistor.

16. The display device of claim 15, wherein the second circuit part comprises:

a thirteenth transistor comprising a gate electrode connected to the second node, a first electrode configured to receive the clock signal, and a second electrode connected to a third output terminal;

a third capacitor comprising a first electrode connected to the second node and a second electrode connected to the third output terminal;

a fourteenth transistor comprising a gate electrode connected to a sixth node, a first electrode connected to the third output terminal, and a second electrode connected to the third node;

a fourth capacitor comprising a first electrode connected to the sixth node and a second electrode connected to the third node;

a fifteenth transistor comprising a gate electrode connected to the second input terminal, a first electrode configured to receive the first high voltage, and a second electrode connected to the second node;

a sixteenth transistor comprising a gate electrode connected to the first input terminal, a first electrode configured to receive the first high voltage, and a second electrode connected to the sixth node;

a seventeenth transistor comprising a gate electrode connected to the second node, a first electrode connected to the sixth node, and a second electrode connected to the third node;

an (18-1)th transistor comprising a gate electrode connected to the sixth node, a first electrode connected to the second node, and a second electrode;

an (18-2)th transistor comprising a gate electrode connected to the sixth node, a first electrode connected to the second electrode of the (18-1)th transistor, and a second electrode connected to the third node;

a (19-1)th transistor comprising a gate electrode connected to the first input terminal, a first electrode connected to the second node, and a second electrode;

a (19-2)th transistor comprising a gate electrode connected to the first input terminal, a first electrode connected to the second electrode of the (19-1)th transistor, and a second electrode connected to the third node;

a (20-1)th transistor comprising a gate electrode connected to the second node, a first electrode configured to receive the first high voltage, and a second electrode; and a (20-2)th transistor comprising a gate electrode connected to the second node, a first electrode connected to the second electrode of the (20-1)th transistor, and a second electrode connected to the second electrode of the (18-1)th transistor and the second electrode of the (19-1)th transistor.

17. The display device of claim 16, wherein the second output terminal outputs the first low voltage or the clock signal, the third output terminal outputs the first low voltage or the clock signal, and the clock signal output by the second output terminal and the clock signal output by the third output terminal do not overlap each other.

18. An electronic device comprising:

a processor configured to provide frame information and control signals; and a display device configured to display an image based on the frame information and the control signals, wherein the display device comprises:

pixels; and stages configured to supply emission signals by which emission timings of the pixels are determined, wherein each of the stages comprises:

a first circuit part configured to apply a first node voltage to a first node;

a second circuit part configured to apply a second node voltage to a second node and directly connected to the first circuit part through a third node;

a third circuit part configured to apply a third node voltage of the third node or a voltage higher than the third node voltage to a fourth node based on the first node voltage and the second node voltage; and a fourth circuit part configured to generate the emission signals based on the first node voltage and a fourth node voltage of the fourth node, wherein the first circuit part and the second circuit part have circuit structures symmetrical about the third node.

* * * * *